United States Patent
Bawa et al.

(10) Patent No.: US 6,697,333 B1
(45) Date of Patent: Feb. 24, 2004

(54) BANDWIDTH LOAD CONSIDERATION IN NETWORK ROUTE SELECTION

(75) Inventors: Satvinder Singh Bawa, Ottawa (CA); Bruce Brown, Rockland (CA); Mike Holloway, Stittsville (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/034,399

(22) Filed: Mar. 4, 1998

(51) Int. Cl.[7] ............................................... H04L 12/26
(52) U.S. Cl. ..................... 370/238; 370/351; 370/395.1
(58) Field of Search ................................. 370/238, 351, 370/400, 395, 410, 254, 255, 401, 230, 238.1, 252; 709/238, 239, 241; 340/827

(56) References Cited

U.S. PATENT DOCUMENTS

| | | | | |
|---|---|---|---|---|
| 5,233,604 A | * | 8/1993 | Ahmadi et al. ............. 370/238 |
| 5,699,347 A | * | 12/1997 | Callon ......................... 370/238 |
| 5,940,372 A | * | 8/1999 | Bertin et al. ................ 370/238 |
| 6,044,075 A | * | 3/2000 | Le Boudec et al. ......... 370/351 |
| 6,084,858 A | * | 7/2000 | Matthews et al. .......... 370/238 |
| 6,104,701 A | * | 8/2000 | Avargues et al. ........... 370/238 |
| 6,141,319 A | * | 10/2000 | Dighe et al. ................ 370/218 |
| 6,195,354 B1 | * | 2/2001 | Skalecki et al. ............ 370/395 |
| 6,256,309 B1 | * | 7/2001 | Daley et al. ........... 370/395.43 |
| 6,370,119 B1 | * | 4/2002 | Basso et al. ................ 370/252 |

* cited by examiner

Primary Examiner—Chi Pham
Assistant Examiner—Alexander O. Boakye
(74) Attorney, Agent, or Firm—Marks & Clerk

(57) ABSTRACT

Methods of considering bandwidth load or load balancing in the selection of an optimal path for routing calls through a switched digital network are described. The described methods are applicable to both new calls and existing connected calls. Algorithms that take into consideration selection criteria such as route cost, number of link hops in the route in addition to bandwidth load are presented.

15 Claims, 1 Drawing Sheet

BANDWIDTH LOAD CONSIDERATION IN NETWORK ROUTE SELECTION

FIELD OF THE INVENTION

This invention relates to switched digital communications networks and more particularly to the use of average bandwidth utilization values respecting physical and logical links between switching nodes as a criteria for finding optimal routes for calls including connected calls.

BACKGROUND

Switched digital communication networks such as Frame Relay (FR) and Asynchronous Transfer Mode (ATM) are used for high speed, broadband data transport. Fixed length ATM cells or variable length Frame Relay packets are propagated through the network infrastructure by switching elements in the network core. Various routing criteria are used for centrally provisioning communication sessions or calls across such communication networks. Some of the common routing criteria include the following: cost of the route (due to for example, carrier tariffs or transmission medium); number of hops in a route; and bandwidth load in a route. In the case of ATM Virtual Connections, whether or not Virtual Path Connection Links are used in a route can become a factor.

Once a call is connected, it will generally use the same route for the life of that call unless a physical link in that route becomes unavailable, and the call has to be re-routed as a result.

This permanence of a route for a call in a network can result in a call traversing a less than optimal route in the course of time. This can be due to one or more of the following reasons:

1) Network growth, which may result in more optimal routes being available in the network than the one initially used to connect a call;
2) Link failures, which may force a re-route of a call. If the new route of the call following a re-route is less optimal than the route used by the call initially, then that call will be, in effect, on a less optimal route following a recovery of the failed link; or
3) Maintenance on links may make them temporarily unavailable-for use by a call.

The generally accepted method to bring a call back to an optimal route has been to run another route search for the call in question. In this case, if the cost of the new route is less than the one taken previously by that call, then the portions of the route which differ in the two alternatives for the call are disconnected and re-connected in a manner which results in minimal disruption of data.

Factors such as bandwidth load in a route are not currently considered for connected calls. The reason for not considering bandwidth load as one of the selection criteria in a route search is that doing so for connected calls is complicated. The basis of this complication is the fact that the call itself modifies the definition of bandwidth-load on its current route. Any good optimal route search algorithm should consider the network in a manner as if the call in question was not connected at all, and hence not occupying any network bandwidth resources.

SUMMARY OF THE INVENTION

This invention is applicable to the management of switched digital communications networks.

It is an object of the present invention to provide a route search implementation of load balancing which takes average link load in a route into account while providing load balancing.

It is a further object of the invention to provide an implementation which can do a route search for connected calls, and still provide load balancing.

Therefore in accordance with a first aspect of the present invention there is provided in a switched digital communication network having multiple alternate paths between a source and a destination, a method of determining the optimal path from the multiple alternatives comprising: evaluating routing characteristics of each of the alternate paths; selecting the alternate representing the least cost; if several alternatives have equal least cost then select from equal least cost paths an alternative having least number of links; if several alternatives have equal least cost and number of links then select from links having equal least cost and number of links an alternative having least average bandwidth usage.

In accordance with a second aspect of the invention there is provided in a switched digital communication network having multiple alternate paths between a source and a destination, a method of selecting the optimal path for re-routing a connected call through the network comprising: determining relative routing criteria respecting each of the multiple paths, the routing criteria including cost, number of links in the path and bandwidth load; selecting a re-route path having least cost; if several of the multiple alternatives have equal least cost, selecting a re-route path having the least number of links; if several of the alternate paths have equal least cost and equal least number of links, selecting a re-route path having a lowest average bandwidth usage; if several of the multiple paths have equal least cost, number of links and average bandwidth usage select a re-route path having the largest number of links carrying the connected call.

BRIEF DESCRIPTION OF THE DRAWING

The invention will now be described in greater detail with reference to the attached drawing wherein.

DETAILED DESCRIPTION OF THE INVENTION

Figure 1:
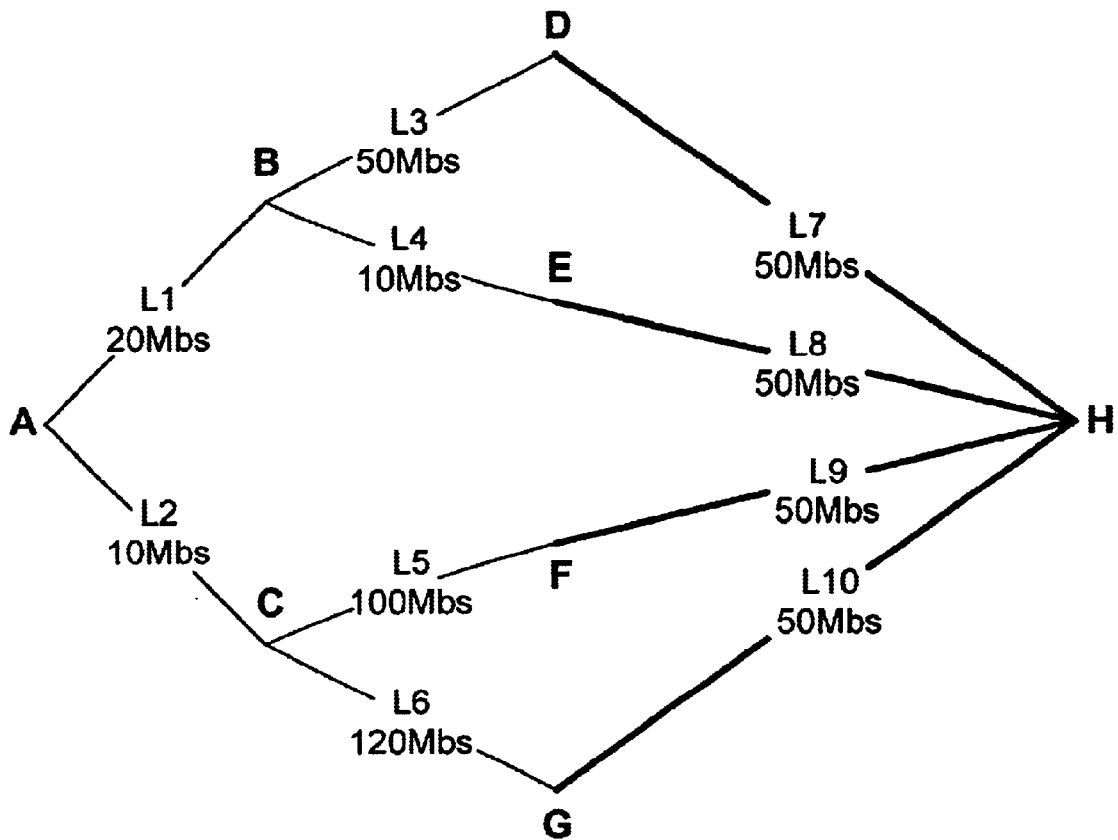
FIG. 1 illustrates a switched network having multiple alternate routes from end point to end point.

Consideration of bandwidth load, or load balancing across links as a route selection criteria requires a concrete definition of what is meant by load balancing in a network. If a route search simply looks at bandwidth load at a point where multiple choices for proceeding onwards are available, then some poor link choices can be made in many cases. Consider the network diagram of FIG. 1 as an example.

This figure shows ten physical links labeled L1 to L10. The bandwidth utilization on a given link is indicated below the link label. For example, L4 has 10 Mbs utilized, L6 has 120 Mbs utilized, L10 has 50 Mbs utilized, etc.

In this example, a new call setup from node A to node H, considering the link load at point A only, will select link L2 over L1 as bandwidth utilization of link L2 is 10 Mbs, as compared to link L1, which has a bandwidth utilization of 20 Mbs. Selection of L2 as the first link of choice will then require that a further selection be made at node C. At node C the link choices are L5 and L6. L5 indicates a lower bandwidth usage than L6 and will, as a consequence, be selected. As shown in FIG. 1 L5 is followed by L9. It will be apparent that the aggregate bandwidth usage from node A to node H over the route selected above does not make the best use of available bandwidth through the network. Obviously, a route selection method at node A that would have included L4 instead of L5 would have provided a better bandwidth balance.

According to the present invention, provisioning methods are provided that do route searches for provisioning calls which favors links using the following criteria (and in the following order):

1) Cost
2) Number of Link Hops
3) Load

The load criteria determination is changed to use the average of utilized bandwidths on links used in the route alternatives available to a call. The provisioning algorithm is changed to do route selection using the following discrimination algorithm:

If multiple route alternatives are available for use in provisioning of a call, use the alternative that has the least cost;
   If there are multiple alternatives with equal cost, then use the alternative with the least number of link hops;
      If there are multiple alternatives of same cost, and number of link hops, then use the alternative with the least average of utilized bandwidth on links used in the route alternative.

Thus a new call of capacity 5 Mbs provides the following link bandwidth alternatives for a network configuration as shown in FIG. 1:

|  | L1 | L2 | L3 | L4 | L5 | L6 | L7 | L8 | L9 | L10 |
|---|---|---|---|---|---|---|---|---|---|---|
| Current Utilization | 20 | 10 | 50 | 10 | 100 | 120 | 50 | 50 | 50 | 50 |
| New | 5 | 5 | 5 | 5 | 5 | 5 | 5 | 5 | 5 | 5 |
| Requirement Total | 25 | 15 | 55 | 15 | 105 | 125 | 55 | 55 | 55 | 55 |

The above table shows, in Mbs, the current utilized bandwidth on the links, the bandwidth of the new call, and the total bandwidth on the given links if the call were to use those respective links. We have the following route alternatives:

| Route Alternatives | Average of Link Bandwidths |
|---|---|
| L1-L3-L7 | (25 + 55 + 55)/3 = 45 Mbs |
| L1-L4-L8 | (25 + 15 + 55)/3 = 31.67 Mbs |
| L2-L5-L9 | (15 + 105 + 55)/3 = 58.33 Mbs |
| L2-L6-L10 | (15 + 125 + 55)/3 = 65 Mbs |

It is clear from the above table that the route choice comprising links L1-L4-L8 provides the best route in terms of load balancing. Also note that the route selection discrimination algorithm inherently results in route alternatives with equal number of link hops being compared. Thus from an implementation point of view, the sum of bandwidths on route alternatives provide the same solution as the average of link bandwidths in route alternatives. Computationally, using link bandwidth sums is a better alternative to bandwidth average. However, for the sake of clarity, the term bandwidth average is used in the following sections.

For optimizing a call that is already connected, the following algorithm is used:

From route alternatives available for that call, calculate new total link bandwidths of these alternatives. While doing the calculation, check that the call is not already riding a link. If the call is already riding on a link, then the bandwidth of the call should not be added to the total link bandwidth again.

While doing a pathsearch, the following modified version of the previous algorithm is used to do route discrimination:

If multiple route alternatives are available for use in provisioning of a call, use the alternative that has the least cost
   If there are multiple alternatives with equal least cost, then use the alternative with the least number of link hops.
      If there are multiple alternatives of same least cost, and same least number of link hops, then use the alternative with the least average of utilized bandwidth on links used in the route alternative.
         If there are multiple alternatives of same least cost, same least number of link hops, same least average utilized bandwidth on links, then select a route with the most number of links already in use by the call.

To illustrate this point with an example, again with reference to FIG. 1 consider a 5 Mbs call from node A to node H, which follows the route L1-L3-L7.

Optimization of this call provides the following link bandwidth alternatives for a network configuration:

|  | L1 | L2 | L3 | L4 | L5 | L6 | L7 | L8 | L9 | L10 |
|---|---|---|---|---|---|---|---|---|---|---|
| Current Utilization | 20 | 10 | 50 | 10 | 100 | 120 | 50 | 50 | 50 | 50 |
| New | 0 | 5 | 0 | 5 | 5 | 5 | 0 | 5 | 5 | 5 |
| Requirement Total | 20 | 15 | 50 | 15 | 105 | 125 | 50 | 55 | 55 | 55 |

The above table shows the current utilized bandwidth on the links, the new bandwidth of the call to be optimized, and the total bandwidth on the given links. As shown the new bandwidth requirement does not apply to the links that are already carrying the call. The following route alternatives result:

| Route Alternatives | Average of Link Bandwidths |
|---|---|
| L1-L3-L7 | (20 + 50 + 50)/3 = 40 Mbs |
| L1-L4-L8 | (20 + 15 + 55)/3 = 30 Mbs |
| L2-L5-L9 | (15 + 105 + 55)/3 = 58.33 Mbs |
| L2-L6-L10 | (15 + 125 + 55)/3 = 65 Mbs |

The least average link bandwidth route is L1-L4-L8

This new algorithm also ensures that if multiple route choices with least load average routes are present, and the route used by a connected call is one of them, then the call stays on its current route.

While particular embodiments of the invention have been described and illustrated it will be apparent to one skilled in the art that various alternatives can be introduced. It is intended that such alternatives, to the extent possible, will fall within the scope of the invention as defined by the appended claims.

What is claimed is:

1. A method of determining an optimal path between a source and a destination in a digital communications network having multiple alternate paths, comprising: evaluating routing criteria of each of the alternate paths, each of the alternate paths having multiple link hops, said routing criteria including cost, number of link hops and bandwidth; selecting the alternate representing the least cost; if several alternatives have equal least cost then select from equal least cost paths an alternative having least number of link hops; if several alternatives have equal least cost and equal least number of link hops then select from paths having equal least cost and equal least number of link hops an alternative having the best bandwidth criteria; wherein said bandwidth criteria is an average bandwidth represented as an aggregate of bandwidth usage for each link hop making up said path between said source and said destination divided by the number of link hops in said path.

2. A method as defined in claim 1 wherein said switched digital communication network is an Asynchronous Transfer Mode (ATM) network.

3. A method as defined in claim 1 wherein said switched digital communication network is a Frame Relay (FR) network.

4. A method as defined in claim 1 wherein said multiple alternate paths between said source and said destination comprise links between multiple intermediate switching nodes.

5. A method as defined in claim 4 wherein said links are physical links.

6. A method as defined in claim 4 wherein said links are logical links.

7. The method as defined in claim 1 wherein said bandwidth criteria is bandwidth utilization of said link hops on said path.

8. The method as defined in claim 7 wherein said bandwidth utilization is the sum of bandwidth utilization on said alternate path.

9. A method of selecting an optimal path for rerouting a connected call between a source and a destination in a digital communication network having multiple alternate paths comprising: determining relative routing criteria respecting each of said multiple paths, said multiple of said paths each having multiple link hops, said routing criteria including cost, number of link hops in said path and bandwidth load; selecting a re-route path having least cost; if several of said multiple alternatives have equal least cost selecting a re-route path having the least number of link hops; if several of said alternate paths have equal least cost and equal least number of link hops, selecting re-route path having a lowest average bandwidth usage; if several of said multiple paths have equal least cost, equal least number of link hops and equal average bandwidth usage select a re-route path having the largest number of link hops carrying said connected call; wherein said average bandwidth is an aggregate of bandwidth usage for each link hop making up said path between said source and said destination divided by the number of link hops in said path.

10. A method as defined in claim 9 wherein said switched digital communication network is an Asynchronous Transfer Mode (ATM) network.

11. A method as defined in claim 9 wherein said switched digital communication network is a Frame Relay (FR) network.

12. A method as defined in claim 9 wherein said multiple alternate paths between said source and said destination comprise links between multiple intermediate switching nodes.

13. A method as defined in claim 12 wherein said links are physical links.

14. A method as defined in claim 12 wherein said links are logical links.

15. A method of determining an optimal path in a switched digital communication network having multiple alternate paths between a source and a destination comprising evaluating routing criteria of each of the alternate paths, each of the alternate paths having multiple link hops, the routine criteria including cost, number of link hops and bandwidth criteria; and selecting the alternate having the best bandwidth criteria wherein the bandwidth criteria is an average bandwidth represented as an aggregate of bandwidth usage for each link hop making up the alternate path between source and the destination divided by the number of link hops in the alternate path, and if several alternate paths have equal bandwidth criteria, selecting the alternate representing the least cost; and if several alternatives have equal least cost and equal bandwidth criteria then selecting from paths having equal least cost and equal bandwidth criteria an alternative having the least number of link hops.

* * * * *